(12) United States Patent
Ukai et al.

(10) Patent No.: US 10,122,027 B2
(45) Date of Patent: Nov. 6, 2018

(54) HIGH-TEMPERATURE OPERATING FUEL-CELL MODULE

(71) Applicant: Panasonic Intellectual Property Management Co., Ltd., Osaka (JP)

(72) Inventors: Kunihiro Ukai, Nara (JP); Hideki Nakata, Kyoto (JP); Aichi Aida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 111 days.

(21) Appl. No.: 15/419,365

(22) Filed: Jan. 30, 2017

(65) Prior Publication Data

US 2017/0237088 A1 Aug. 17, 2017

(30) Foreign Application Priority Data

Feb. 16, 2016 (JP) ................. 2016-027181

(51) Int. Cl.
| | |
|---|---|
| *H01M 8/04014* | (2016.01) |
| *H01M 8/04701* | (2016.01) |
| *H01M 8/0612* | (2016.01) |
| *H01M 8/0662* | (2016.01) |
| *H01M 8/2425* | (2016.01) |

(52) U.S. Cl.
CPC ... *H01M 8/04022* (2013.01); *H01M 8/04738* (2013.01); *H01M 8/0618* (2013.01); *H01M 8/0662* (2013.01); *H01M 8/2425* (2013.01); *H01M 8/0625* (2013.01)

(58) Field of Classification Search
CPC ......... H01M 8/04022; H01M 8/04343; H01M 8/0435
See application file for complete search history.

(56) References Cited

U.S. PATENT DOCUMENTS

| | | |
|---|---|---|
| 2003/0129555 A1 | 7/2003 | Mukai et al. |
| 2004/0115577 A1 | 6/2004 | Maenishi et al. |
| 2012/0178003 A1 | 7/2012 | Venkataraman et al. |

FOREIGN PATENT DOCUMENTS

| | | |
|---|---|---|
| JP | 2003-254514 | 9/2003 |
| JP | 2004-156895 | 6/2004 |

OTHER PUBLICATIONS

The Extended European Search Report dated May 17, 2017 for the related European Patent Application No. 17154534.6.

*Primary Examiner* — Olatunji A Godo
(74) *Attorney, Agent, or Firm* — McDermott Will & Emery LLP

(57) ABSTRACT

A high-temperature operating fuel-cell module includes a fuel-cell stack; a fuel-cell stack container in which the fuel-cell stack is contained and cathode off-gas discharged from the fuel-cell stack flows; a cathode off-gas collector that is provided in the fuel-cell stack container and in which the cathode off-gas is collected; an anode off-gas passage through which anode off-gas discharged from the fuel-cell stack flows; and a combustor that combusts the cathode off-gas collected in the cathode off-gas collector and the anode off-gas flowing through the anode off-gas passage, the combustor comprising: a combustion chamber in which the anode and cathode off-gas are mixed and combusted, an ejector that is connected to the anode off-gas passage and ejects the anode off-gas into the combustion chamber, and a diffusion plate that surrounds the ejector so that the ejector is located at the center of the diffusion plate, and ejects the cathode off-gas into the combustion chamber.

13 Claims, 6 Drawing Sheets

HIGH-TEMPERATURE OPERATING FUEL-CELL MODULE

BACKGROUND

1. Technical Field

The present invention relates to a high-temperature operating fuel-cell module using a high-temperature operating fuel-cell stack that operates at a high temperature.

2. Description of the Related Art

Fuel cells can achieve high total efficiency because even a small fuel cell has high power generation efficiency and it is possible to utilize heat such as heat generated during power generation or heat obtained by combusting off-gas discharged from a fuel cell. For example, the efficiency of a fuel cell can be improved by combusting off-gas discharged from the fuel cell by using a burner and using heat thus obtained as heat for a reforming reaction in a reforming unit. In such a case where heat of combustion of off-gas discharged from a fuel cell is used, for example, for a reforming reaction, a burner that can efficiently combust the off-gas is needed. As such a burner, the burners disclosed in Japanese Unexamined Patent Application Publication No. 2004-156895 and Japanese Unexamined Patent Application Publication No. 2003-254514 have been proposed for example.

Japanese Unexamined Patent Application Publication No. 2004-156895 discloses a burner that includes a fuel distributor comprising a plurality of fuel ejection holes for ejecting fuel gas, such as natural gas, mainly containing a hydrocarbon-based substance into a combustion space and an air ejection member disposed so as to surround the fuel distributor and comprising a plurality of air ejection holes for ejecting air into the combustion space. According to the burner disclosed in Japanese Unexamined Patent Application Publication No. 2004-156895, air is supplied from the air ejection holes in almost equal amounts, and therefore a stable flame can be formed.

Japanese Unexamined Patent Application Publication No. 2003-254514 discloses a burner for a hydrogen generation device that includes a distributor comprising an upper-stage gas ejection hole for ejecting city gas and off-gas into a combustion chamber. In this burner for a hydrogen generation device, an air ejection hole for ejecting air for combustion into the combustion chamber is formed in a side wall of the combustion chamber so as to be substantially opposed to the upper-stage gas ejection hole. In the burner for a hydrogen generation device disclosed in Japanese Unexamined Patent Application Publication No. 2003-254514, mixture of the fuel gas, off-gas and air for combustion can be promoted by collision of a jet flow of the fuel gas and the off-gas and a jet flow of the air for combustion.

SUMMARY

One non-limiting and exemplary embodiment provides, as an example, a high-temperature operating fuel-cell module that achieves improved power generation efficiency by improving combustion performance in a combustion unit.

In one general aspect, the techniques disclosed here feature a high-temperature operating fuel-cell module including: a fuel-cell stack that generates power by utilizing an electrochemical reaction of oxidant gas supplied to a cathode and reformed gas supplied to an anode; a fuel-cell stack container in which the fuel-cell stack is contained; cathode off-gas discharged from the cathode of the fuel-cell stack flowing in a space of the fuel-cell stack container in which the fuel-cell stack is contained; a cathode off-gas collector that is provided in the fuel-cell stack container, the cathode off-gas collector being a space in which the cathode off-gas is collected; an anode off-gas passage through which anode off-gas discharged from the anode of the fuel-cell stack flows; and a combustor that combusts the cathode off-gas collected in the cathode off-gas collector and the anode off-gas flowing through the anode off-gas passage, the combustor comprising: a combustion chamber that is a space in which the anode off-gas and the cathode off-gas are mixed and combusted, an ejector that is connected to the anode off-gas passage and ejects the anode off-gas into the combustion chamber, and a diffusion plate that surrounds the ejector so that the ejector is located at the center of the diffusion plate and ejects the cathode off-gas collected in the cathode off-gas collector into the combustion chamber.

A high-temperature operating fuel-cell module according to one aspect of the present invention produces an effect that power generation efficiency can be improved by improving combustion performance in a combustion unit.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
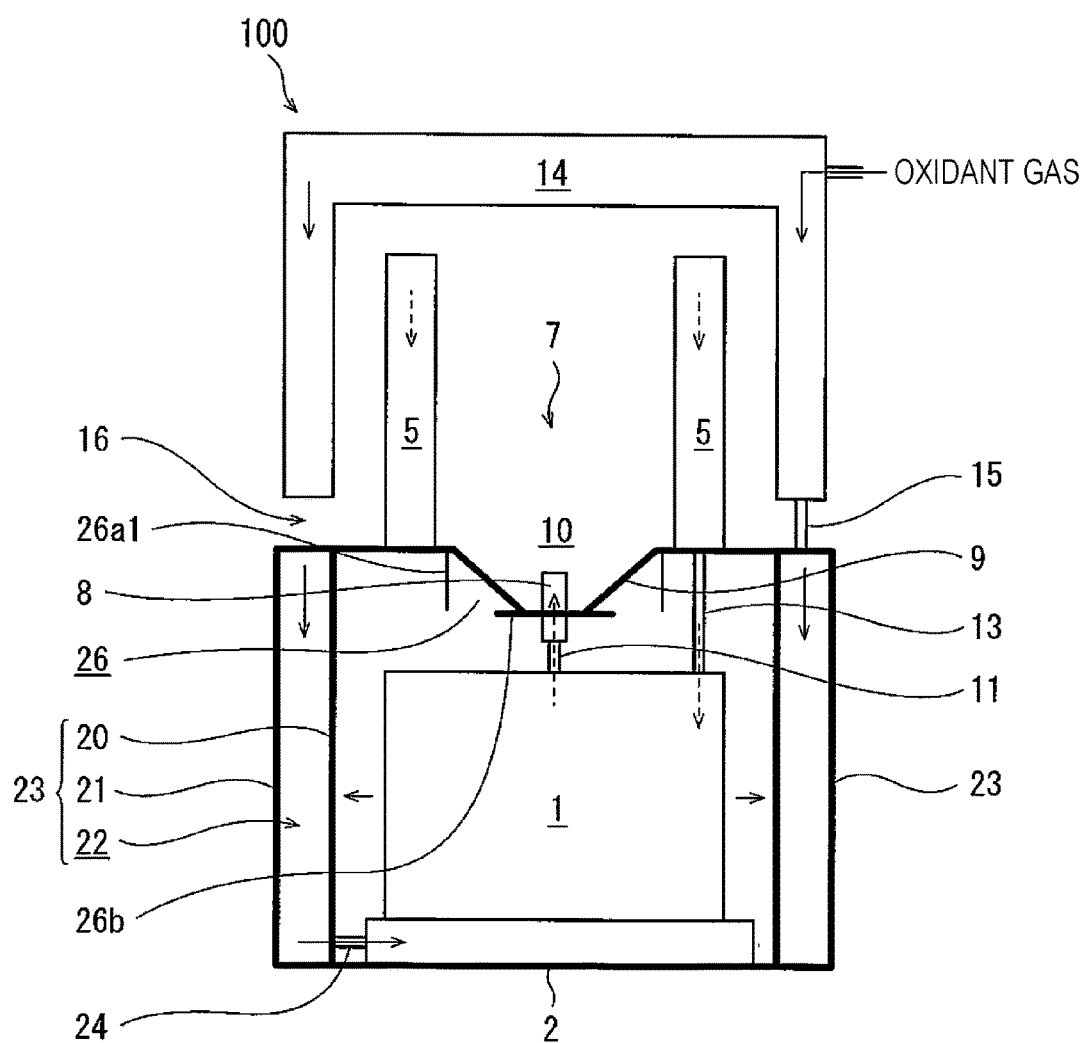
FIG. 1 is a side view illustrating an example of an outline configuration of a high-temperature operating fuel-cell module according to Embodiment 1 of the present invention.

Underlying Knowledge Forming Basis of One Aspect of the Present Disclosure

The inventors of the present invention conducted diligent studies on a solid-oxide fuel cell system (hereinafter referred to as an SOFC system) as an example of a high-temperature operating fuel cell that can effectively utilize high-temperature exhaust heat. As a result, the inventors of the present invention obtained the following findings. Specifically, in the SOFC system, which operates at a high temperature, for example, in the vicinity of 600° C. or higher, exhaust heat generated during power generation can be effectively utilized. In order to further improve total efficiency, it is also possible to ignite anode off-gas discharged from an anode, combusting the anode off-gas together with cathode off-gas discharged from a cathode, and effectively utilize heat of exhaust gas thus generated. For example, a fuel cell system in which an SOFC stack, a reforming unit, a heat exchange unit for heat exchange between heat of oxidant gas and reformed gas and heat of exhaust gas, and the like are contained as an integral member in a container may be employed as a configuration for effectively utilizing heat of exhaust gas. According to such a configuration, passages through which fluids such as oxidant gas or cathode off-gas and reformed gas or anode off-gas flow are likely to become long and complicated, and a heat loss sometimes occurs during flowing of the fluid through the passages.

Furthermore, in the SOFC system, the amount of hydrogen contained in the anode off-gas decreases at high fuel utilization (Uf), and therefore the amount of combustion in the combustion unit becomes smaller and combustion becomes unstable. In a solid-oxide fuel cell (SOFC), a relationship between the amount of supply of reformed gas and the amount of supply of oxidant gas is determined in accordance with the amount of power generation. It is therefore impossible to control the amount of combustion in the combustion unit by changing the amount of supply of reformed gas and the amount of supply of oxidant gas, for example, unlike the hydrogen generation devices disclosed in Japanese Unexamined Patent Application Publication No. 2004-156895 and Japanese Unexamined Patent Application Publication No. 2003-254514. The inventors of the present invention found that it is necessary to improve performance of combustion of anode off-gas and cathode off-gas in order to secure a necessary amount of combustion in a combustion unit even during operation at high fuel utilization.

In view of the circumstances, the inventors of the present invention conducted studies on an SOFC system in which stable combustion performance can be secured in a combustion unit even during operation (especially during operation at high fuel utilization). As a result, the inventors of the present invention accomplished the present invention. Specifically, the present invention provides the following aspects.

In order to solve the above problems, a high-temperature operating fuel-cell module according to a first aspect of the present invention a high-temperature operating fuel-cell module including: a fuel-cell stack that generates power by utilizing an electrochemical reaction of oxidant gas supplied to a cathode and reformed gas supplied to an anode; a fuel-cell stack container in which the fuel-cell stack is contained, cathode off-gas discharged from the cathode of the fuel-cell stack flowing in a space of the fuel-cell stack container in which the fuel-cell stack is contained; a cathode off-gas collector that is provided in the fuel-cell stack container, the cathode off-gas collector being a space in which the cathode off-gas is collected; an anode off-gas passage through which anode off-gas discharged from the anode of the fuel-cell stack flows; and a combustor that combusts the cathode off-gas collected in the cathode off-gas collector and the anode off-gas flowing through the anode off-gas passage, the combustor comprising: a combustion chamber that is a space in which the anode off-gas and the cathode off-gas are mixed and combusted, an ejector that is connected to the anode off-gas passage and ejects the anode off-gas into the combustion chamber, and a diffusion plate that surrounds the ejector so that the ejector is located at the center of the diffusion plate and ejects the cathode off-gas collected in the cathode off-gas collector into the combustion chamber.

According to the arrangement, since the cathode off-gas collector is provided, the cathode off-gas discharged from the fuel-cell stack in the fuel-cell stack container can be collected in the cathode off-gas collector once. Furthermore, the collected cathode off-gas can be ejected into the combustion chamber from the diffusion plate that is disposed so as to surround the ejector. This makes it possible to improve dispersibility of the cathode off-gas ejected into the combustion chamber. It is therefore possible to improve performance of mixing of the cathode off-gas ejected from the diffusion plate and the anode off-gas ejected from the ejector in the combustion chamber. As a result, it is possible to improve combustion performance in the combustion chamber.

Especially even during operation at high fuel utilization (Uf), in which case combustion performance in the combustion chamber deteriorates, it is possible to improve dispersibility of the cathode off-gas ejected from the diffusion plate and to improve performance of mixing of the cathode off-gas and the anode off-gas. It is therefore possible to secure stable combustion performance in the combustion chamber. Since the cathode off-gas collector is provided in the fuel-cell stack container and the cathode off-gas collected in the cathode off-gas collector is ejected into the combustion chamber of the combustor, high-temperature cathode off-gas can be introduced into the combustion chamber of the combustor. This makes it possible to keep a heat loss of the cathode off-gas small and increase combustion temperature. It is therefore possible to maintain a combustion temperature and secure good combustion performance even during operation at high fuel utilization (Uf).

Therefore, the high-temperature operating fuel-cell module according to the first aspect of the present invention produces an effect that combustion performance in the combustor can be improved and thereby power generation efficiency can be increased.

In the first aspect, a high-temperature operating fuel-cell module according to a second aspect of the present invention may be arranged such that the fuel-cell stack container includes an air heat exchanger that exchanges heat between the oxidant gas that has not been supplied to the cathode of the fuel-cell stack yet and the cathode off-gas flowing in the fuel-cell stack container.

According to the arrangement, since the air heat exchanger is provided in the fuel-cell stack container, part of heat of the high-temperature cathode off-gas can be collected by the oxidant gas and supplied to the fuel-cell stack. It is therefore possible to effectively utilize exhaust heat (heat of the cathode off-gas) for maintenance of the temperature of the fuel-cell stack.

In the second aspect, a high-temperature operating fuel-cell module according to a third aspect of the present invention may be arranged such that a side wall of the fuel-cell stack container includes an inner wall and an outer wall; and the air heat exchanger is constituted by the inner wall, the outer wall, and a flow passage that is a space between the inner wall and the outer wall and through which the oxidant gas flows, the air heat exchanger exchanging heat between the oxidant gas and the cathode off-gas with the inner wall interposed therebetween.

According to the arrangement, the air heat exchanger is constituted by the inner wall and the outer wall, which constitute a side wall of the fuel-cell stack container, and the flow passage formed between the inner wall and the outer wall. That is, the side wall part of the fuel-cell stack container has a double-walled structure made up of the inner wall and the outer wall between which an air layer exists. This makes it possible to keeps heat release from the fuel-cell stack container small.

In any one of the first through third aspects, a high-temperature operating fuel-cell module according to a fourth aspect of the present invention may be arranged such that the ejector has a plurality of anode off-gas ejection holes from which the anode off-gas is ejected into the combustion chamber; and the diffusion plate has a plurality of cathode off-gas ejection holes from which the cathode off-gas collected in the cathode off-gas collector is ejected in a direction that is substantially opposed to a direction of a jet flow of the anode off-gas ejected from the anode off-gas ejection holes.

This makes it possible to improve performance of mixing of the cathode off-gas and the anode off-gas. It is therefore possible to secure stable combustion performance in the combustion chamber even during operation at high fuel utilization. As a result, the high-temperature operating fuel-cell module according to the fourth aspect of the present invention can stably generate power even during operation at high fuel utilization.

In any one of the first through fourth aspects, a high-temperature operating fuel-cell module according to a fifth aspect of the present invention may be arranged to further include a reformer that generates reformed gas by reforming supplied fuel by a reforming reaction, the reformer being heated by heat of exhaust gas generated by mixing and combusting the anode off-gas and the cathode off-gas in the combustion chamber.

According to the arrangement, heat needed for a reforming reaction in the reformer can be covered by heat of exhaust gas generated by combustion of the cathode off-gas and the anode off-gas. It is therefore possible to increase the total efficiency of the high-temperature operating fuel-cell module.

In the fifth aspect, a high-temperature operating fuel-cell module according to a sixth aspect of the present invention may be arranged such that the combustor is provided between the reformer and the fuel-cell stack.

According to the arrangement, the high-temperature combustor is sandwiched between the reformer and the fuel-cell stack. It is therefore possible to effectively utilize heat.

In any one of the first through sixth aspects, a high-temperature operating fuel-cell module according to a seventh aspect of the present invention may be arranged such that the fuel-cell stack container has a combustor outer peripheral wall that is provided so as to surround the diffusion plate, the cathode off-gas collector being provided in a space surrounded by the combustor outer peripheral wall and the diffusion plate; and the fuel-cell stack is disposed in the fuel-cell stack container on a side opposite to a direction in which a flame formed by combustion in the combustion chamber is directed.

According to the arrangement, the fuel-cell stack is provided in the fuel-cell stack container on a side opposite to a direction in which a flame formed by combustion in the combustion chamber is directed. This allows the high-temperature cathode off-gas to rise in the fuel-cell stack container due to a convective effect and be ejected into the combustion chamber provided above the fuel-cell stack via the diffusion plate. With this arrangement, it is possible to improve dispersibility of the cathode off-gas ejected into the combustion chamber.

In any one of the first through sixth aspects, a high-temperature operating fuel-cell module according to an eighth aspect of the present invention may be arranged such that the combustion chamber is opened so that a flame formed by combustion in the combustion chamber is directed upward in a vertical direction, and the fuel-cell stack is disposed below the combustion chamber.

In any one of the first through eighth aspects, a high-temperature operating fuel-cell module according to a ninth aspect of the present invention may be arranged such that the cathode off-gas collector has an opening through which the cathode off-gas flowing in the fuel-cell stack container flows; and a projected area of the opening is smaller than that of the fuel-cell stack.

According to the arrangement, since the projected area of the opening of the cathode off-gas collector is smaller than that of the fuel-cell stack, the cathode off-gas discharged into the fuel-cell stack container is concentrated and flow thereof is straightened in the cathode off-gas collector. It is therefore possible to improve dispersibility of the cathode off-gas ejected from the diffusion plate into the combustion chamber.

In any one of the first through eighth aspects, a high-temperature operating fuel-cell module according to a tenth aspect of the present invention may be arranged such that the cathode off-gas collector has an opening through which the cathode off-gas flowing in the fuel-cell stack container flows; and an area of the opening through which the cathode off-gas passes is smaller than a cross sectional area of a flow passage through which the cathode off-gas that has not reached the opening yet flows.

In the ninth or tenth aspect, a high-temperature operating fuel-cell module according to an eleventh aspect of the present invention may be arranged such that the opening of the cathode off-gas collector is narrow; and the cathode off-gas flowing in the fuel-cell stack container flows into the cathode off-gas collector through the narrow opening.

In the ninth or tenth aspect, a high-temperature operating fuel-cell module according to a twelfth aspect of the present invention may be arranged to further include a flow straightening plate that is provided in the opening of the cathode off-gas collector and straightens flow of the cathode off-gas flowing into the cathode off-gas collector through the opening.

According to the arrangement, since the flow straightening plate is provided, it is possible to improve dispersibility of the cathode off-gas ejected from the diffusion plate.

In any one of the first through twelfth aspects, a high-temperature operating fuel-cell module according to a thirteenth aspect of the present invention may be arranged such that the ejector has a cylindrical shape and the diffusion plate surrounds the ejector so that the center thereof is located at a central axis of the ejector; and the fuel-cell stack and the fuel-cell stack container are disposed so that a central line passing midpoints of the fuel-cell stack and the fuel-cell stack container in a width direction thereof coincides with the central axis of the ejector.

According to the arrangement, the cathode off-gas that has been discharged from the fuel-cell stack flows symmetrically with respect to the central axis of the ejector and is then collected in the cathode off-gas collector, and then the collected cathode off-gas is ejected from the diffusion plate. It is therefore possible to improve dispersibility of the cathode off-gas ejected into the combustion chamber.

Embodiments of the present invention are described below with reference to the drawings.

Embodiment 1

Configuration of High-Temperature Operating Fuel-Cell Module

First, a configuration of a high-temperature operating fuel-cell module 100 according to Embodiment 1 is described with reference to FIG. 1. FIG. 1 is a side view illustrating an example of an outline configuration of the high-temperature operating fuel-cell module 100 according to Embodiment 1 of the present invention. FIG. 1 illustrates a configuration of a substantial part of the high-temperature operating fuel-cell module 100 viewed from a side face thereof. The high-temperature operating fuel-cell module 100 can be configured as a hollow cylindrical body or columnar body whose bottom surface corresponds to a lower side of FIG. 1 and whose top surface corresponds to an upper side of FIG. 1.

In Embodiment 1, an SOFC system comprising a solid-oxide fuel cell (SOFC) in a power generation unit is described as an example of the high-temperature operating fuel-cell module 100. However, Embodiment 1 is not limited to this. For example, the high-temperature operating fuel-cell module 100 may be an MCFC system comprising a molten carbonate fuel cell (MCFC) in a power generation unit. That is, the high-temperature operating fuel-cell module 100 can be any fuel cell system that can effectively utilize high-temperature exhaust heat.

The high-temperature operating fuel-cell module 100 generates heat by utilizing an electrochemical reaction of oxidant gas (cathode gas), such as air, that is externally supplied and reformed gas (anode gas) obtained by reforming fuel, such as natural gas, that is externally supplied. The high-temperature operating fuel-cell module 100 includes a fuel-cell stack 1, a fuel-cell stack container 2, a reforming unit 5, a combustion unit 7, an anode off-gas passage 11, a reformed gas passage 13, an outer air heat exchange unit 14, a first air passage 15, an exhaust gas outlet 16, an inner air heat exchange unit (air heat exchanger) 23, a second air passage 24, and a cathode off-gas collecting unit 26. Note that the horizontal direction of FIG. 1 is a width direction of the high-temperature operating fuel-cell module 100, and the vertical direction of FIG. 1 is a height direction of the high-temperature operating fuel-cell module 100.

The fuel-cell stack 1 is arranged such that, for example, a plurality of fuel cells, each of which generates power by utilizing oxidant gas that is externally supplied and reformed gas generated by a reforming reaction in the reforming unit 5, are stacked and connected in series. The fuel-cell stack 1 may be arranged such that a plurality of flat-plate fuel cells are stacked or may be arranged such that a plurality of cylindrical fuel cells are stacked. In the high-temperature operating fuel-cell module 100 according to Embodiment 1, the fuel-cell stack 1 operates at a high temperature in the vicinity of 600° C. or higher. The fuel-cell stack 1 has a temperature detector that detects an operating temperature of the fuel-cell stack 1, electrodes for extracting an electric current generated in the fuel-cell stack 1, and the like although these members are not illustrated in FIG. 1. The configuration of the fuel-cell stack 1 is similar to that of a general fuel-cell stack and therefore detailed description thereof is omitted.

The fuel-cell stack container 2 is a container in which the fuel-cell stack 1 is contained. Cathode off-gas discharged from a cathode of the fuel-cell stack 1 flows in a space of the fuel-cell stack container 2 in which the fuel-cell stack 1 is contained. A side wall of the fuel-cell stack container 2 is made up of an inner wall 20 and an outer wall 21 as illustrated in FIG. 1, and the fuel-cell stack 1 is contained in a space inside the inner wall 20, i.e., a space surrounded by the inner wall 20, a bottom surface, and a top surface.

The side wall part of the fuel-cell stack container 2 is the inner air heat exchange unit 23 that allows oxidant gas supplied to the cathode side of the fuel-cell stack 1 to be preheated by heat of cathode off-gas discharged from the fuel-cell stack 1. Note that the inner air heat exchange unit 23 corresponds to an air heat exchanger of the present invention. That is, the inner air heat exchange unit 23 is made up of the inner wall 20, the outer wall 21, and a flow passage 22 that is a space formed between the inner wall 20 and the outer wall 21 and through which oxidant gas flows. The oxidant gas that is externally supplied through the outer air heat exchange unit 14 and the first air passage 15 flows through the flow passage 22. In the inner air heat exchange unit 23, the oxidant gas which flows through the flow passage 22 provided between the inner wall 20 and the outer wall 21 is preheated by exchanging heat with cathode off-gas flowing in the fuel-cell stack container 2 with the inner wall 20 interposed therebetween. An end of the inner air heat exchange unit 23 on an upstream side in a direction of flow of the oxidant gas is connected to the first air passage 15, and an end of the inner air heat exchange unit 23 on a downstream side is connected to the second air passage 24. The oxidant gas that has passed through the inner air heat exchange unit 23 is supplied to the cathode of the fuel-cell stack 1 via the second air passage 24. The oxidant gas that has been supplied to the cathode is discharged as cathode off-gas from the fuel-cell stack 1 toward the inner wall 20 of the fuel-cell stack container 2. The discharged cathode off-gas and oxidant gas flowing through the inner air heat exchange unit 23 exchange heat, and thus the oxidant gas is preheated. Then, the cathode off-gas is led to the cathode off-gas collecting unit 26 provided in the fuel-cell stack container 2 and is used for combustion in the combustion unit 7.

The cathode off-gas collecting unit 26 is a space that is provided in the fuel-cell stack container 2 and in which the cathode off-gas is collected. The cathode off-gas collecting unit 26 is provided above the fuel-cell stack container 2 so as to surround a diffusion plate 9, as illustrated in FIG. 1. The cathode off-gas that has been discharged from the fuel-cell stack 1 and has lost part of heat through heat exchange with the oxidant gas flowing through the inner air heat exchange unit 23 is collected in the cathode off-gas collecting unit 26. In the present embodiment, an ejection unit 8 for ejecting anode off-gas is provided at a central part of the top surface of the fuel-cell stack container 2, and anode off-gas discharged from an anode of the fuel-cell stack 1 is supplied to the ejection unit 8 through the anode off-gas passage 11. The diffusion plate 9 surrounds the ejection unit 8 so that the center thereof is located at the ejection unit 8, and the cathode off-gas collecting unit 26 is provided so as to surround the diffusion plate 9 in the fuel-cell stack container 2.

As illustrated in FIG. 1, a central part of the top surface of the fuel-cell stack container 2 is depressed so as to be tapered from the top surface toward the bottom surface. This depressed part forms a combustion chamber 10 in which the anode off-gas and the cathode off-gas are combusted. At the center of a bottom of the depressed part, the ejection unit 8 is provided so as to protrude in an upward direction that is perpendicular to the top surface of the fuel-cell stack container 2. The ejection unit 8 has a cylindrical shape and has, on a side surface thereof, a plurality of anode off-gas ejection holes 81 for ejecting anode off-gas. The anode off-gas is ejected from the anode off-gas ejection holes 81 in a radial direction from a central axis o of the cylindrical ejection unit 8. The diffusion plate 9 for ejecting the cathode off-gas is provided around the central axis o of the ejection unit 8 so as to surround the ejection unit 8. That is, the diffusion plate 9 constitutes a wall surface of an inclined part of the depressed part (the combustion chamber 10) that is tapered. Since the high-temperature operating fuel-cell module 100 according to Embodiment 1 is placed on a horizontal surface, a direction in which the ejection unit 8 protrudes coincides with a vertical direction.

The ejection unit 8, the diffusion plate 9, and the combustion chamber 10 constitute the combustion unit 7 according to the present embodiment. A detailed configuration of the combustion unit 7 will be described later.

The reforming unit 5 prompts a reforming reaction by utilizing fuel, such as natural gas, that is externally supplied and water and thereby generates reformed gas that is hydrogen-containing gas. The reforming unit 5 is filled with a reforming catalyst such as a Ru-based reforming catalyst. The reformed gas generated in the reforming unit 5 is supplied to the fuel-cell stack 1 through the reformed gas passage 13. A supply passage for externally supplying fuel and a water passage for externally supplying water are connected to the reforming unit 5 although these passages are not illustrated in FIG. 1. The reforming unit 5 has a configuration similar to a general reforming unit for generating reformed gas from fuel by utilizing a steam-reforming reaction, and therefore description of a detailed configuration thereof is omitted.

Flow of Fluids in High-Temperature Operating Fuel-Cell Module

Flow of the fluids (oxidant gas, cathode off-gas, reformed gas, and anode off-gas) in the high-temperature operating fuel-cell module 100 is described below.

In the high-temperature operating fuel-cell module 100, fuel and water are externally supplied to the reforming unit 5. The supplied water turns into steam due to heat of exhaust gas generated in the combustion chamber 10 of the combustion unit 7, and then mixed gas in which the steam and raw materials are mixed is supplied to the reforming catalyst of the reforming unit 5. The supplied mixed gas is used to promote a reforming reaction using the reforming catalyst, and thus reformed gas (anode gas) is generated. The reformed gas thus generated is supplied to the fuel-cell stack 1 contained in the fuel-cell stack container 2 through the reformed gas passage 13. That is, heat needed in the reforming reaction in the reforming unit 5 is covered by heat of the exhaust gas.

Furthermore, in the high-temperature operating fuel-cell module 100, air is externally supplied as oxidant gas to the outer air heat exchange unit 14. In the outer air heat exchange unit 14, the oxidant gas is preheated by heat exchange between the oxidant gas flowing through the outer air heat exchange unit 14 and the exhaust gas that has lost part of heat in the reforming unit 5. The exhaust gas that has further lost part of heat due to the heat exchange with the oxidant gas is discharged to an outside via the exhaust gas outlet 16.

Meanwhile, the oxidant gas preheated in the outer air heat exchange unit 14 flows into the fuel-cell stack container 2 through the first air passage 15 and is supplied to the inner air heat exchange unit 23. In the inner air heat exchange unit 23, the oxidant gas preheated in the outer air heat exchange unit 14 is further preheated by heat exchange between the oxidant gas and the cathode off-gas discharged from the fuel-cell stack 1. The oxidant gas thus further preheated is supplied to the fuel-cell stack 1 through the second air passage 24.

The fuel-cell stack 1 generates power by utilizing an electrochemical reaction of the supplied reformed gas and oxidant gas. Cathode off-gas containing oxidant gas that has not been used for power generation and anode off-gas containing reformed gas that has not been used for power generated are discharged from the fuel-cell stack 1. The cathode off-gas is discharged from the fuel-cell stack 1 into the fuel-cell stack container 2, exchanges heat with the oxidant gas flowing through the inner air heat exchange unit 23 as described above, and is then led to the cathode off-gas collecting unit 26. The cathode off-gas led to the cathode off-gas collecting unit 26 is ejected from the diffusion plate 9 into the combustion chamber 10. Meanwhile, the anode off-gas discharged from the fuel-cell stack 1 is supplied to the ejection unit 8 through the anode off-gas passage 11 and is then ejected from the ejection unit 8 into the combustion chamber 10. Then, the anode off-gas is ignited by an igniting unit (not illustrated) in the combustion chamber 10 and thus the anode off-gas is combusted together with the cathode off-gas.

Configuration of Combustion Unit

Figure 2:
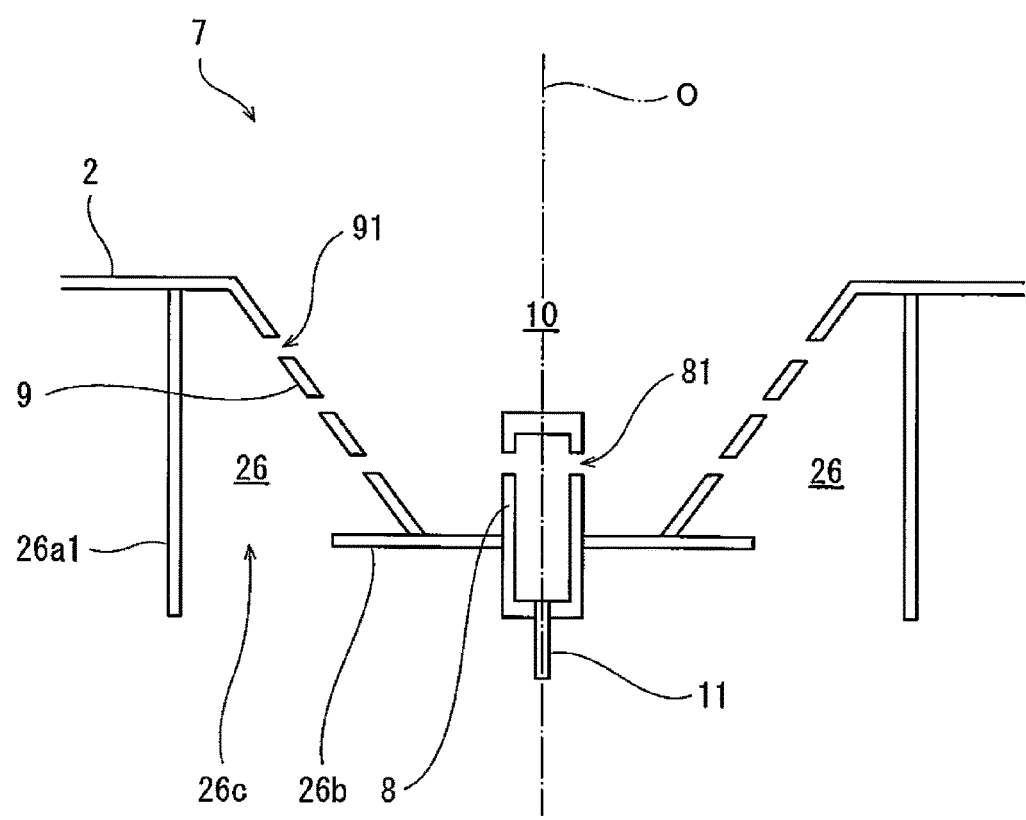
FIG. 2 is a side view illustrating an example of an outline configuration of a combustion unit of the high-temperature operating fuel-cell module of FIG. 1.

Next, a configuration of the combustion unit 7 of the high-temperature operating fuel-cell module 100 according to Embodiment 1 is described in detail below with reference to FIG. 2. As described above, the combustion unit 7 is a unit that is provided on the top surface of the fuel-cell stack container 2 and in which anode off-gas and cathode off-gas are mixed and combusted. FIG. 2 is a side view illustrating an example of an outline configuration of the combustion unit 7 of the high-temperature operating fuel-cell module 100 illustrated in FIG. 1.

In the combustion unit 7, the ejection unit 8 is provided so as to protrude from a bottom of the combustion chamber 10 in an upward direction perpendicular to the bottom of the combustion chamber 10 that is parallel with the top surface of the fuel-cell stack container 2, as illustrated in FIG. 2. The ejection unit 8 has a cylindrical shape and has, at predetermined positions of the side surface thereof, the plurality of anode off-gas ejection holes 81. The ejection unit 8 can eject anode off-gas from the anode off-gas ejection holes 81 into the combustion chamber 10. The anode off-gas passage 11 is connected to a base end side of the ejection unit 8, and the anode off-gas discharged from the fuel-cell stack 1 is supplied to the ejection unit 8 through the anode off-gas passage 11.

In the combustion unit 7, the diffusion plate 9 is provided so as to surround the ejection unit 8 in the combustion chamber 10 so that the center thereof is located at the ejection unit 8. Assume that a surface of the diffusion plate 9 that is located inside the fuel-cell stack container 2 is an inner side surface and a surface of the diffusion plate 9 that is located outside the fuel-cell stack container 2 is an outer side surface, the cathode off-gas collecting unit 26 is provided on the same side as the inner side surface of the diffusion plate 9, and the combustion chamber 10 is provided on the same side as the outer side surface of the diffusion plate 9. In the fuel-cell stack container 2, the cathode off-gas collecting unit 26 is provided so as to surround the diffusion plate 9. The diffusion plate 9 has a plurality of cathode off-gas ejection holes 91 for ejecting the cathode off-gas collected in the cathode off-gas collecting unit 26 into the combustion chamber 10. Through the cathode off-gas ejection holes 91, the cathode off-gas collecting unit 26 and the combustion chamber 10 are communicated with each other.

As described above, in the combustion unit 7, the anode off-gas discharged from the fuel-cell stack 1 is ejected into the combustion chamber 10 through the anode off-gas ejection holes 81 of the ejection unit 8, and the cathode off-gas is ejected into the combustion chamber 10 through the cathode off-gas ejection holes 91 of the diffusion plate 9. In the high-temperature operating fuel-cell module 100 according to the present embodiment, the cathode off-gas ejection holes 91 are provided so as to pass through the diffusion plate 9 in the horizontal direction, and the anode off-gas ejection holes 81 are provided so as to pass through the side surface of the ejection unit 8 in the horizontal direction. That is, the cathode off-gas ejection holes 91 are provided so as to be substantially opposed to the anode off-gas ejection holes 81. The diffusion plate 9 ejects the cathode off-gas collected in the cathode off-gas collecting unit 26 in a direction that is substantially opposed to a jet flow direction of the anode off-gas ejected from the anode off-gas ejection holes 81. This causes the jet flow of the anode off-gas ejected from the anode off-gas ejection holes 81 and the jet from of the cathode off-gas ejected from the cathode off-gas ejection holes 91 to collide with each other. As a result, mixture of the anode off-gas and the cathode off-gas is promoted. Note that the high-temperature operating fuel-cell module 100 may further include an igniting unit that ignites mixture of the anode off-gas and the cathode off-gas and a combustion detection unit that detects a combustion state in the combustion unit 7 although these units are not illustrated in FIG. 2. The igniting unit and the combustion detection unit can be generally known igniting unit and combustion detection unit, and therefore detailed description thereof is omitted.

As described above, the central part of the top surface of the fuel-cell stack container 2 is tapered toward the bottom surface side and thus the tapered combustion chamber 10 is formed in the combustion unit 7, and the ejection unit 8 for ejecting anode off-gas is provided at the center of the bottom of the combustion chamber 10 so as to protrude from the bottom of the combustion chamber 10 in an upward direction perpendicular to the top surface of the fuel-cell stack container 2. The combustion chamber 10 is opened on an upper side thereof so that a flame is formed upward in the vertical direction. Since the combustion chamber 10 is tapered so that the width thereof becomes larger in a direction in which the flame is formed, the flow velocity of the combustion exhaust gas can be successively decreased in the direction in which the flame is formed. It is therefore possible to secure stability of combustion in the combustion chamber 10.

As illustrated in FIG. 2, the cathode off-gas collecting unit 26 is formed as a space surrounded by a vertical wall 26a1 extending in a downward direction perpendicular to the top surface of the fuel-cell stack container 2, a horizontal wall 26b that protrudes in the width direction (horizontal direction) of the fuel-cell stack container 2 along the bottom of the combustion chamber 10 depressed toward the fuel-cell stack container 2, and the diffusion plate 9. A gap is provided between the vertical wall 26a1 and the horizontal wall 26b, and an opening 26c through which the cathode off-gas flows into the cathode off-gas collecting unit 26 is formed by this gap. The vertical wall 26a1 and the horizontal wall 26b constitute a combustion unit outer peripheral wall of the present invention that is provided so as to surround the diffusion plate 9. It can therefore be said that the cathode off-gas collecting unit 26 is provided in a space surrounded by the combustion unit outer peripheral wall and the diffusion plate 9.

It is desirable that the area of the opening 26c through which the cathode off-gas passes be smaller than a cross-sectional area of a flow passage through which the cathode off-gas that has not reached the opening 26c yet flows. Since the opening 26c concentrates the cathode off-gas and straightens flow of the cathode off-gas once, dispersibility of the cathode off-gas ejected from the cathode off-gas ejection holes 91 can be improved.

Note that the projected area of the opening 26c viewed directly above the opening 26c is smaller than of the fuel-cell stack 1 viewed directly above the fuel-cell stack 1. In the present embodiment, the opening 26c is set narrow by the vertical wall 26a1 and the horizontal wall 26b, and the projected area of the opening 26c is adjustable by the positions of these two walls.

In the high-temperature operating fuel-cell module 100 according to Embodiment 1, the reforming unit 5 is provided on the top surface of the fuel-cell stack container 2 so as to surround the combustion chamber 10 so that the reforming unit 5 can be efficiently heated by heat of exhaust gas generated by combustion in the combustion chamber 10. The combustion unit 7 is provided on the top surface of the fuel-cell stack container 2 so as to be located between the reforming unit 5 and the fuel-cell stack 1. Furthermore, the combustion chamber 10 is opened so that a flame is formed upward in the vertical direction in the combustion chamber 10 of the combustion unit 7. That is, the fuel-cell stack 1 is disposed in the fuel-cell stack container 2 on a side opposite to a direction in which the flame formed by combustion in the combustion chamber 10 is directed.

The outer periphery of the high-temperature operating fuel-cell module 100 may be covered with a heat insulation material although the heat insulation material is not illustrated in FIGS. 1 and 2.

Characteristics of Configuration of High-Temperature Operating Fuel-Cell Module

Next, characteristics of the configuration of the high-temperature operating fuel-cell module 100 according to Embodiment 1 configured as above are described.

As described above, the anode off-gas discharged from the fuel-cell stack 1 is supplied to the ejection unit 8 of the combustion unit 7 through the anode off-gas passage 11. The cathode off-gas discharged from the fuel-cell stack 1 is discharged into the fuel-cell stack container 2 and is then collected in the cathode off-gas collecting unit 26.

If the cathode off-gas collecting unit 26 is not provided in the fuel-cell stack container 2, the cathode off-gas more easily flows upward along the inner wall 20 of the fuel-cell stack container 2. Accordingly, the amount of flow of the cathode off-gas ejected from a cathode off-gas ejection hole 91 on an upper side of the diffusion plate 9 tends to be larger than that of flow of the cathode off-gas ejected from a cathode off-gas ejection hole 91 on a lower side of the diffusion plate 9. This makes flow amounts of the cathode off-gas ejected from the diffusion plate 9 uneven.

Meanwhile, in the high-temperature operating fuel-cell module 100 according to Embodiment 1, the cathode off-gas collecting unit 26 is provided in the fuel-cell stack container 2 so as to surround the diffusion plate 9, and the cathode off-gas collected in the cathode off-gas collecting unit 26 is ejected into the combustion chamber 10 through the cathode off-gas ejection holes 91 of the diffusion plate 9. That is, in the high-temperature operating fuel-cell module 100 according to Embodiment 1, the cathode off-gas is collected once in the cathode off-gas collecting unit 26. This makes it possible to improve dispersibility of the cathode off-gas ejected from the cathode off-gas ejection holes 91. It is therefore possible to improve performance of mixing with the anode off-gas ejected from the anode off-gas ejection holes 81 of the ejection unit 8 in the combustion chamber 10. As a result, it is possible to improve combustion performance in the combustion chamber 10.

Especially during operation at high fuel utilization (Uf), the anode off-gas contains less hydrogen. In addition, if the cathode off-gas is unevenly ejected from the cathode off-gas ejection holes 91, mixture of the anode off-gas and the cathode off-gas in a part where a flow amount of the ejected cathode off-gas is small contains less hydrogen than that in the other part. As a result, the combustion performance in the combustion chamber 10 deteriorates.

Meanwhile, in the high-temperature operating fuel-cell module 100 according to Embodiment 1, dispersibility of the cathode off-gas ejected from the diffusion plate 9 can be improved as described above, and therefore stable combustion performance can be secured in the combustion chamber 10.

In the high-temperature operating fuel-cell module 100 according to Embodiment 1, the ejection unit 8 has the plurality of anode off-gas ejection holes 81 that are provided at constant intervals. Furthermore, the diffusion plate 9 has the plurality of cathode off-gas ejection holes 91 that are provided at constant intervals throughout the diffusion plate 9 and eject cathode off-gas in a direction substantially opposed to the anode off-gas ejected from the anode off-gas ejection holes 81. Since both of the ejection unit 8 and the diffusion plate 9 have a plurality of ejection holes, a space in which the cathode off-gas and the anode off-gas are mixed can be made large in in the combustion chamber 10. Furthermore, since the cathode off-gas and the anode off-gas are ejected so as to be substantially opposed to each other, the performance of mixing of the anode off-gas and the cathode off-gas can be improved. It is therefore possible to secure stable combustion performance in the combustion chamber 10 even during operation at high fuel utilization (Uf).

Therefore, according to the high-temperature operating fuel-cell module 100 according to Embodiment 1, power can be stably generated even during operation at high fuel utilization, high energy is obtained by power generation relative to input fuel, and the total efficiency is high.

In the high-temperature operating fuel-cell module 100 according to Embodiment 1, the projected area of the opening 26c of the cathode off-gas collecting unit 26 is smaller than that of the fuel-cell stack 1. With this configuration, the cathode off-gas discharged into the fuel-cell stack container 2 is concentrated and flow thereof is straightened in the cathode off-gas collecting unit 26. This makes it possible to improve dispersibility of the cathode off-gas ejected from the cathode off-gas ejection holes 91.

In the high-temperature operating fuel-cell module 100 according to Embodiment 1, the fuel-cell stack 1 and the fuel-cell stack container 2 are disposed so that a central line passing midpoints of the fuel-cell stack 1 and the fuel-cell stack container 2 in the width direction thereof coincides with the central axis o of the ejection unit 8. This allows the cathode off-gas discharged from the fuel-cell stack 1 to flow symmetrically relative to the central axis o and be collected in the cathode off-gas collecting unit 26, and the cathode off-gas thus collected is ejected from the cathode off-gas ejection holes 91. This makes it possible to improve dispersibility of the cathode off-gas ejected into the combustion chamber 10.

In the high-temperature operating fuel-cell module 100 according to Embodiment 1, the diffusion plate 9 of the combustion unit 7 is provided as a top surface part of the fuel-cell stack container 2. Since the fuel-cell stack 1 operates at a high temperature, the temperature of the cathode off-gas discharged from the fuel-cell stack 1 and the temperature inside the fuel-cell stack container 2 also become high. In the high-temperature operating fuel-cell module 100 according to Embodiment 1, the cathode off-gas is supplied to the combustion chamber 10 of the combustion unit 7 via the diffusion plate 9. In other words, the cathode off-gas is directly supplied from the fuel-cell stack container 2 to the combustion chamber 10. That is, in the high-temperature operating fuel-cell module 100 according to Embodiment 1, the length of a passage through which the cathode off-gas is supplied to the combustion chamber 10 can be made short. This makes it possible to prevent a heat loss in the passage leading to the combustion chamber 10 as compared with a configuration in which the cathode off-gas is supplied to the combustion chamber 10 through a pipe or the like. It is therefore possible to effectively use heat. Furthermore, the high-temperature operating fuel-cell module 100 according to Embodiment 1 is advantageous not only from the perspective of effective use of heat resulting from prevention of a heat loss of the cathode off-gas, but also from the following perspectives.

Specifically, in the high-temperature operating fuel-cell module 100 according to Embodiment 1, the cathode off-gas can be supplied to the combustion chamber 10 while keeping a high temperature. This makes it possible to maintain an amount of heat needed to maintain a combustion reaction in the combustion chamber 10. It is therefore possible to stabilize combustion even under a combustion condition in which combustion heat is small such as an operating condition in which fuel utilization is high.

In the high-temperature operating fuel-cell module 100 according to Embodiment 1, the inner air heat exchange unit 23 is provided as a side wall part of the fuel-cell stack container 2 as described above. That is, the side wall part of the fuel-cell stack container 2 has a double-walled structure constituted by the inner wall 20 and the outer wall 21 between which an air layer is provided. This makes it possible to keep heat release from the fuel-cell stack container 2 small. Furthermore, the oxidant gas can be preheated by heat of the cathode off-gas in the inner air heat exchange unit 23 and be supplied to the fuel-cell stack 1. That is, part of heat of the high-temperature cathode off-gas can be collected by the oxidant gas and be supplied to the fuel-cell stack 1. Therefore, the high-temperature operating fuel-cell module 100 according to Embodiment 1 can effectively utilize exhaust heat (heat of the cathode off-gas) to maintain the temperature of the fuel-cell stack 1.

In the high-temperature operating fuel-cell module 100 according to Embodiment 1, the combustion unit 7 is provided on the top surface of the fuel-cell stack container 2 so as to be located between the reforming unit 5 and the fuel-cell stack 1 as described above. Since the high-temperature combustion unit 7 is sandwiched between the reforming unit 5 and the fuel-cell stack 1, heat can be effectively utilized. Furthermore, the combustion chamber 10 is opened so that a flame is formed upward in the vertical direction in the combustion chamber 10 of the combustion unit 7. The fuel-cell stack 1 is disposed below the combustion unit 7. This allows the high-temperature cathode off-gas to rise due to a convective effect in the fuel-cell stack container 2 and then be ejected into the combustion chamber 10 provided above the fuel-cell stack 1 via the diffusion plate 9. With this configuration, it is possible to improve dispersibility of the cathode off-gas ejected from the cathode off-gas ejection holes 91 into the combustion chamber 10 and to improve utilization of heat of the cathode off-gas.

Modification 1

Figure 3:
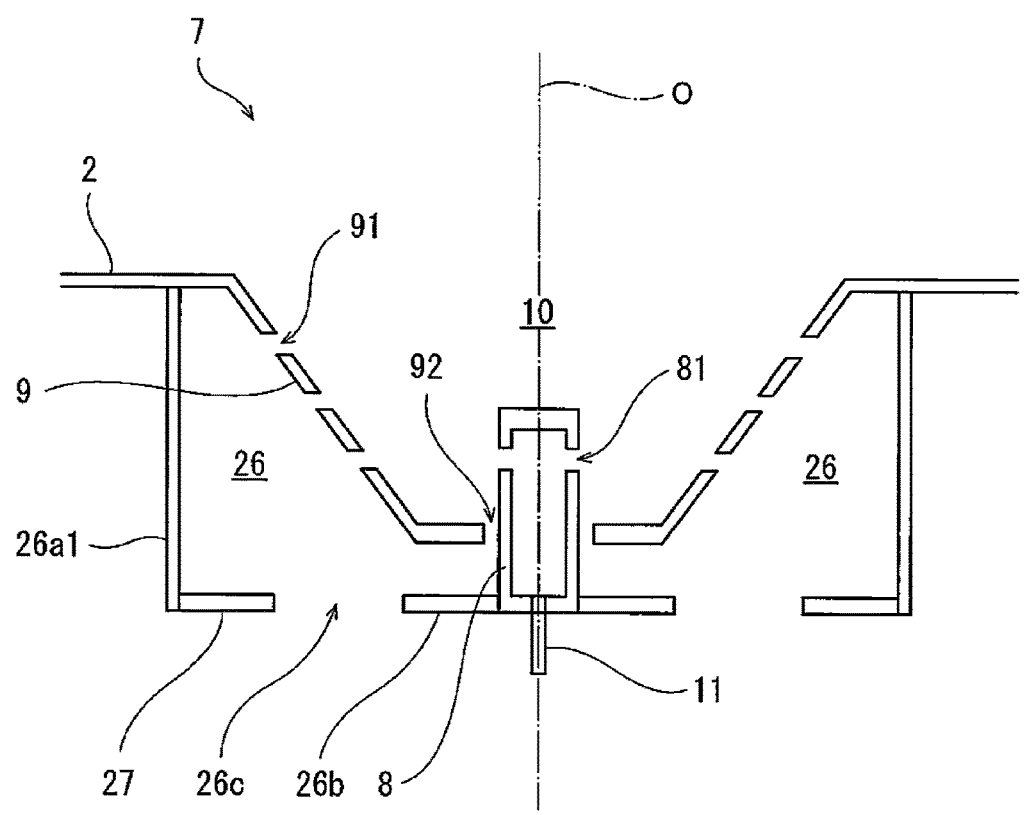
FIG. 3 is a side view illustrating an example of an outline configuration of a combustion unit of a high-temperature operating fuel-cell module according to Modification 1 of Embodiment 1 of the present invention illustrated in FIG. 1.

Next, Modification 1 of the high-temperature operating fuel-cell module 100 according to Embodiment 1 illustrated in FIGS. 1 and 2 is described with reference to FIG. 3. FIG. 3 is a side view illustrating an example of an outline configuration of a combustion unit 7 of a high-temperature operating fuel-cell module 100 according to Modification 1 of Embodiment 1 of the present invention illustrated in FIG. 1.

The combustion unit 7 of the high-temperature operating fuel-cell module 100 according to Modification 1 of Embodiment 1 is different from the combustion unit 7 according to Embodiment 1 in that the combustion unit 7 according to Modification 1 further includes a flow straightening plate 27 and a lower ejection hole 92 for ejecting cathode off-gas in a direction substantially orthogonal to a direction in which anode off-gas is ejected as illustrated in FIG. 3. The combustion unit 7 according to Modification 1 is similar to the combustion unit 7 according to Embodiment 1 except for this. Similar members are given identical reference signs, and description thereof is omitted.

The flow straightening plate 27 is a plate member for straightening flow of cathode off-gas that flows into a cathode off-gas collecting unit 26. The flow straightening plate 27, which makes the area of an opening 26c narrow, increases a pressure loss of the cathode off-gas flowing into the cathode off-gas collecting unit 26 and increases the flow velocity of the cathode off-gas. This makes it possible to straighten flow of the cathode off-gas flowing into the cathode off-gas collecting unit 26. In the high-temperature operating fuel-cell module 100 according to Modification 1 of Embodiment 1, the flow straightening plate 27 is provided at an end of a vertical wall 26a1 so as to be perpendicular to the vertical wall 26a1. However, the flow straightening plate 27 is not limited to this and may be provided on a horizontal wall 26b side. The flow straightening plate 27 can be any one that can increase a pressure loss of the cathode off-gas flowing into the cathode off-gas collecting unit 26 and straighten flow of the cathode off-gas, and the position, number, and shape thereof are not limited in particular. Since the high-temperature operating fuel-cell module 100 according to Modification 1 of Embodiment 1 includes the flow straightening plate 27, it is possible to improve dispersibility of cathode off-gas ejected from cathode off-gas ejection holes 91.

The lower ejection hole 92 is an ejection hole for ejecting cathode off-gas from a bottom of a combustion chamber 10 upward along a direction in which an ejection unit 8 protrudes. The lower ejection hole 92 passes through the bottom of the combustion chamber 10 in a direction perpendicular to the bottom of the combustion chamber 10 so that the cathode off-gas collecting unit 26 and the combustion chamber 10 are communicated with each other. That is, a direction of a jet flow of the cathode off-gas ejected from the lower ejection hole 92 is substantially orthogonal to a direction of a jet flow of the anode off-gas ejected from the ejection unit 8. It is therefore possible to further promote mixture of the anode off-gas and the cathode off-gas in the combustion chamber 10.

Embodiment 2

Figure 4:
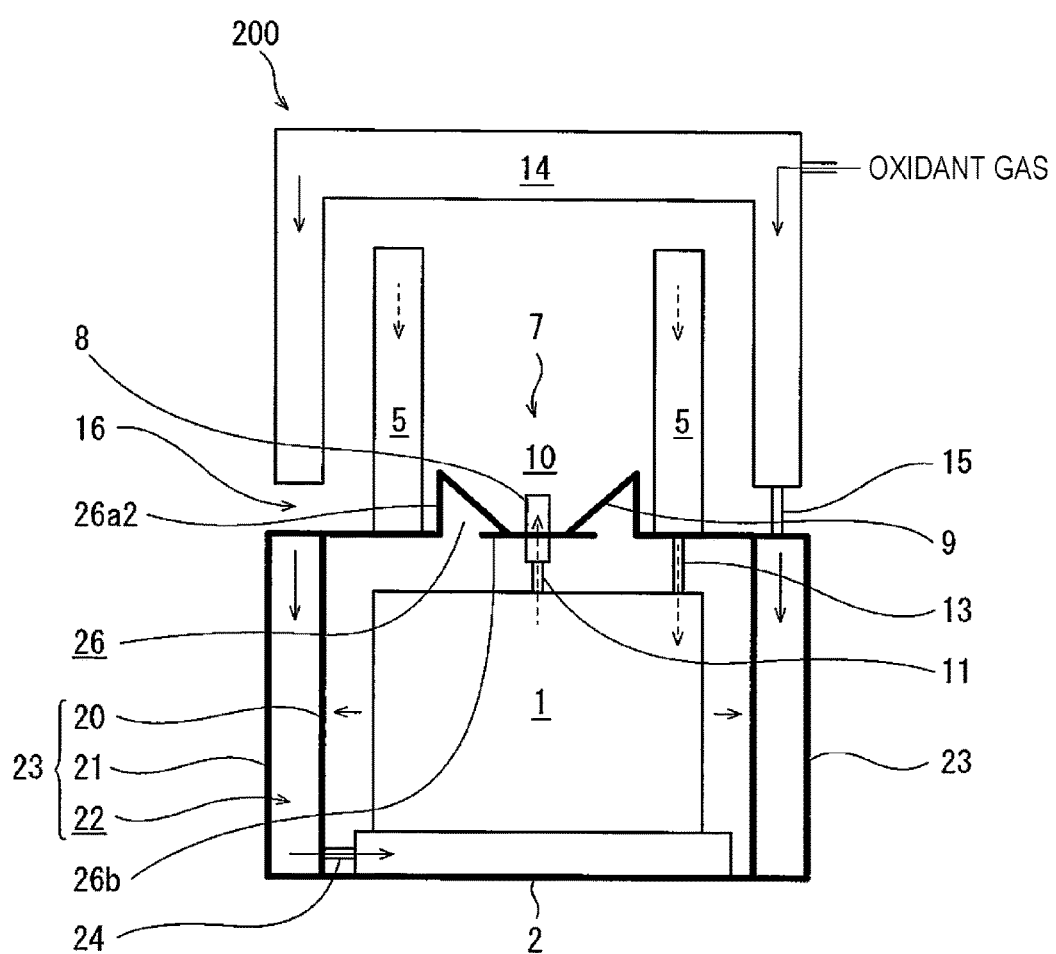
FIG. 4 is a side view illustrating an example of an outline configuration of a high-temperature operating fuel-cell module according to Embodiment 2 of the present invention.

Next, a configuration of a high-temperature operating fuel-cell module 200 according to Embodiment 2 of the present invention is described below with reference to FIG. 4. FIG. 4 is a side view illustrating an example of an outline configuration of the high-temperature operating fuel-cell module 200 according to Embodiment 2 of the present invention. FIG. 4 illustrates a configuration of a substantial part of the high-temperature operating fuel-cell module 200 viewed from a side face thereof. The high-temperature operating fuel-cell module 200 can be configured as a hollow cylindrical body or columnar body whose bottom surface corresponds to a lower side of FIG. 4 and whose top surface corresponds to an upper side of FIG. 4.

The high-temperature operating fuel-cell module 200 according to Embodiment 2 has a configuration similar to the high-temperature operating fuel-cell module 100 according to Embodiment 1 except for the configuration of a combustion unit 7. Similar members are given identical reference signs, and description thereof is omitted.

The combustion unit 7 according to Embodiment 1 has the vertical wall 26a1 extending in a downward direction perpendicular to the top surface of the fuel-cell stack container 2. Meanwhile, the combustion unit 7 according to Embodiment 2 includes a vertical wall 26a2 extending in an upward direction perpendicular to the top surface of the fuel-cell stack container 2, as illustrated in FIG. 4. In the combustion unit 7 according to Embodiment 1, the combustion chamber 10 has a depressed shape so that the bottom thereof is located below the top surface of the fuel-cell stack container 2. Meanwhile, in the combustion unit 7 according to Embodiment 2, the bottom of the combustion chamber 10 is at the same height as the top surface of the fuel-cell stack container 2. Furthermore, in the combustion unit 7 according to Embodiment 1, the diffusion plate 9 is disposed between the top surface of the fuel-cell stack container 2 and the bottom of the combustion chamber 10. Meanwhile, in the combustion unit 7 according to Embodiment 2, a diffusion plate 9 is disposed between an end of the vertical wall 26a2 and the bottom of the combustion chamber 10. That is, the configuration of the combustion unit 7 according to Embodiment 2 is different from that of the combustion unit 7 according to Embodiment 1 in that a cathode off-gas collecting unit 26 protrudes upward (toward a side on which a reforming unit 5 is provided) from the top surface of the fuel-cell stack container 2 so as to surround the diffusion plate 9.

In the high-temperature operating fuel-cell module 200 according to Embodiment 2, the cathode off-gas collecting unit 26 protrudes in the combustion unit 7 toward the side on which the reforming unit 5 is provided, as described above. This makes it possible to keep the height of the top surface of the fuel-cell stack container 2 low. It is therefore possible to reduce heat release of cathode off-gas flowing in the fuel-cell stack container 2 and thereby improve heat efficiency of the high-temperature operating fuel-cell module 200.

Embodiment 3

Figure 5:
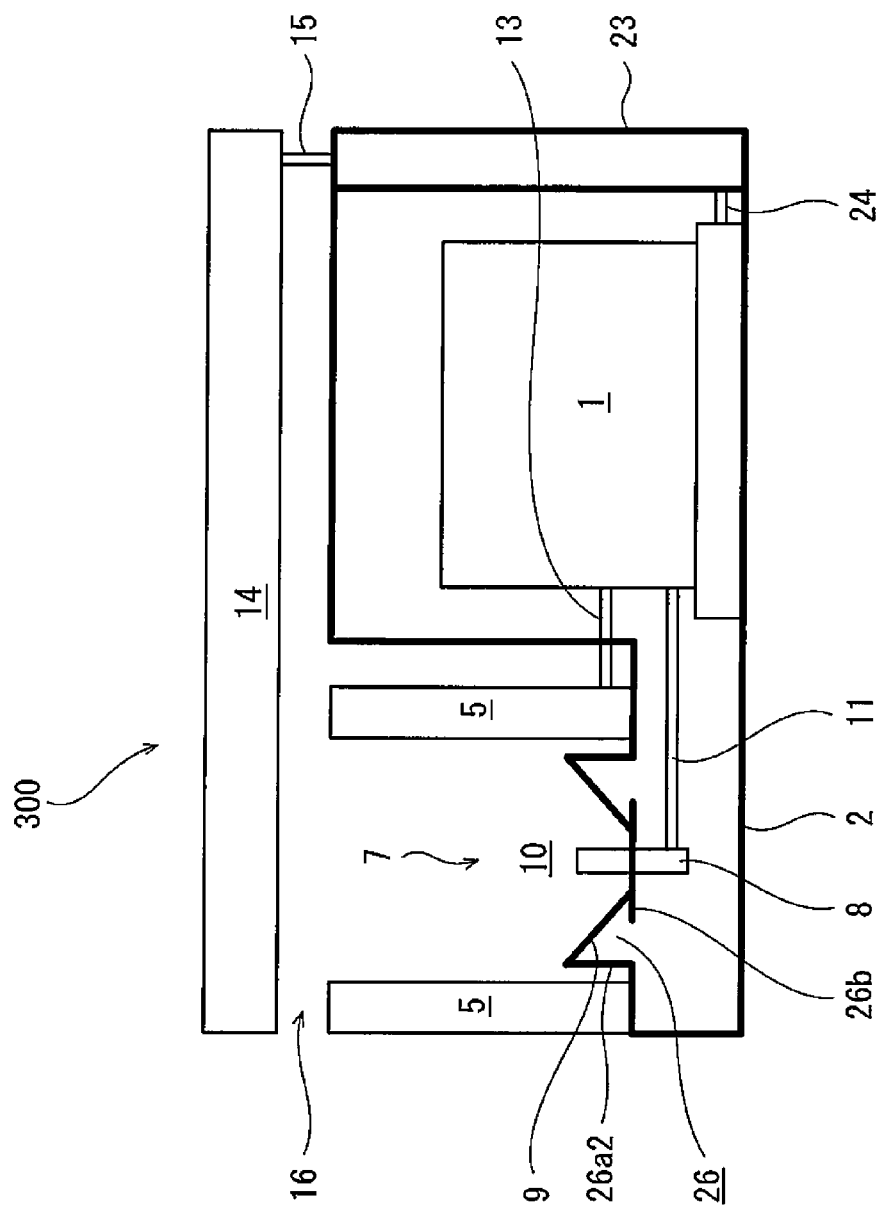
FIG. 5 is a side view illustrating an example of an outline configuration of a high-temperature operating fuel-cell module according to Embodiment 3 of the present invention.

FIG. 5 is a side view illustrating an example of an outline configuration of a high-temperature operating fuel-cell module 300 according to Embodiment 3 of the present invention. The high-temperature operating fuel-cell module 300 according to Embodiment 2 has a configuration similar to the high-temperature operating fuel-cell module 200 according to Embodiment 2 but is different in terms of a positional relationship of a cathode off-gas collecting unit 26, a combustion unit 7, and a reforming unit 5 relative to a fuel-cell stack 1. Furthermore, in the high-temperature operating fuel-cell module 200 according to Embodiment 2, the outer air heat exchange unit 14 is disposed so as to cover a side part and an upper part of the reforming unit 5. Meanwhile, in the high-temperature operating fuel-cell module 300 according to Embodiment 3, an outer air heat exchange unit 14 is disposed above the reforming unit 5 and a fuel-cell stack container 2.

More specifically, in the high-temperature operating fuel-cell module 300 according to Embodiment 3, the units are disposed so that the combustion unit 7 is located not above the fuel-cell stack 1 in the vertical direction but on a side of the fuel-cell stack 1 and the reforming unit 5 surrounds a combustion chamber 10 of the combustion unit 7. Furthermore, the outer air heat exchange unit 14 has a shape that covers upper parts of the fuel-cell stack container 2 and the reforming unit 5.

By thus disposing the units, the height of the high-temperature operating fuel-cell module 300 can be made low. This makes it possible to relatively easily place the high-temperature operating fuel-cell module 300 even in a place where there is a restriction in height.

Numerous modifications and other embodiments are apparent from the above description for those skilled in the art. The above description should be interpreted solely as illustration and has been provided for the purpose of teaching those skilled in the art the best mode of the present invention. Details of structures and/or functions of the present invention can be substantially changed without departing from the spirits of the present invention.

Figure 6:
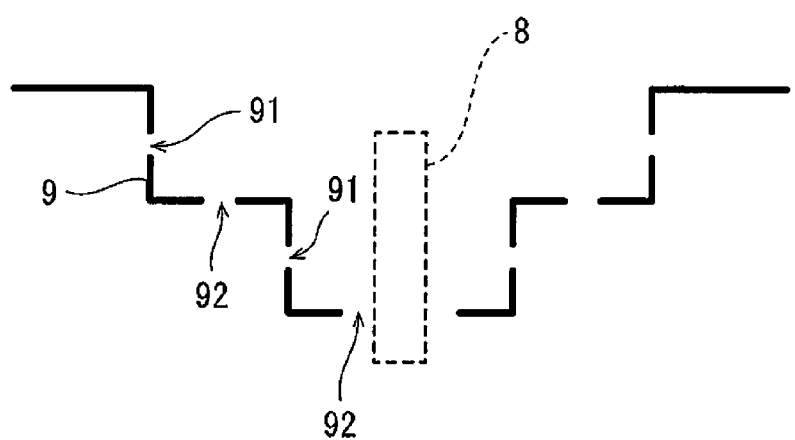
FIG. 6 is a diagram illustrating a modification of a diffusion plate of a combustion unit provided in each of the high-temperature operating fuel-cell modules according to Embodiments 1 through 3 of the present invention.

For example, the combustion chamber 10 of each of the high-temperature operating fuel-cell modules 100, 200, and 300 is arranged such that the diffusion plate 9 is tapered toward the bottom of the combustion chamber 10, but the shape of the diffusion plate 9 is not limited to this. In a predetermined section on the opening side of the combustion chamber 10, the diffusion plate 9 may have a shape extending in parallel in the vertical direction instead of the tapered shape. Alternatively, the diffusion plate 9 may have a step-like shape whose width becomes smaller toward the bottom, as illustrated in FIG. 6. FIG. 6 is a diagram illustrating a modification of the diffusion plate 9 of the combustion unit 7 provided in each of the high-temperature operating fuel-cell modules 100, 200, and 300 according to Embodiments 1 through 3 of the present invention. As illustrated in FIG. 6, in a case where the diffusion plate 9 has a step-like shape, the diffusion plate 9 may have, in a horizontal surface thereof, a lower ejection hole 92 and have, in a vertical surface intersecting at right angles with the horizontal surface, a cathode off-gas ejection hole 91.

A high-temperature operating fuel-cell module according to the present invention makes it possible to stabilize performance of combustion of cathode off-gas and anode off-gas even during operation under an operating condition in which fuel utilization is high and to effectively utilize exhaust heat generated during power generation and is therefore useful as a fuel cell system comprising high total efficiency.

What is claimed is:

1. A high-temperature operating fuel-cell module comprising:
   a fuel-cell stack that generates power by utilizing an electrochemical reaction of oxidant gas supplied to a cathode and reformed gas supplied to an anode;
   a fuel-cell stack container in which the fuel-cell stack is contained, cathode off-gas discharged from the cathode of the fuel-cell stack flowing in a space of the fuel-cell stack container in which the fuel-cell stack is contained;
   a cathode off-gas collector that is provided in the fuel-cell stack container, the cathode off-gas collector being a space in which the cathode off-gas is collected;
   an anode off-gas passage through which anode off-gas discharged from the anode of the fuel-cell stack flows; and
   a combustor that combusts the cathode off-gas collected in the cathode off-gas collector and the anode off-gas flowing through the anode off-gas passage,
   the combustor comprising:
      a combustion chamber that is a space in which the anode off-gas and the cathode off-gas are mixed and combusted,
      an ejector that is connected to the anode off-gas passage and ejects the anode off-gas into the combustion chamber, and
      a diffusion plate that surrounds the ejector so that the ejector is located at the center of the diffusion plate, and ejects the cathode off-gas collected in the cathode off-gas collector into the combustion chamber.

2. The high-temperature operating fuel-cell module according to claim 1, wherein
   the fuel-cell stack container includes an air heat exchanger that exchanges heat between the oxidant gas that has not been supplied to the cathode of the fuel-cell stack yet and the cathode off-gas flowing in the fuel-cell stack container.

3. The high-temperature operating fuel-cell module according to claim 2, wherein
   a side wall of the fuel-cell stack container includes an inner wall and an outer wall; and
   the air heat exchanger is constituted by the inner wall, the outer wall, and a flow passage that is a space between the inner wall and the outer wall and through which the oxidant gas flows, the air heat exchanger exchanging heat between the oxidant gas and the cathode off-gas with the inner wall interposed therebetween.

4. The high-temperature operating fuel-cell module according to claim 1, wherein
   the ejector has a plurality of anode off-gas ejection holes from which the anode off-gas is ejected into the combustion chamber; and
   the diffusion plate has a plurality of cathode off-gas ejection holes from which the cathode off-gas collected in the cathode off-gas collector is ejected in a direction that is substantially opposed to a direction of a jet flow of the anode off-gas ejected from the anode off-gas ejection holes.

5. The high-temperature operating fuel-cell module according to claim 1, further comprising a reformer that generates reformed gas by reforming supplied fuel by a reforming reaction,
   the reformer being heated by heat of exhaust gas generated by mixing and combusting the anode off-gas and the cathode off-gas in the combustion chamber.

6. The high-temperature operating fuel-cell module according to claim 5, wherein
the combustor is provided between the reformer and the fuel-cell stack.

7. The high-temperature operating fuel-cell module according to claim 1, wherein
the fuel-cell stack container has a combustor outer peripheral wall that is provided so as to surround the diffusion plate, the cathode off-gas collector being provided in a space surrounded by the combustor outer peripheral wall and the diffusion plate; and
the fuel-cell stack is disposed in the fuel-cell stack container on a side opposite to a direction in which a flame formed by combustion in the combustion chamber is directed.

8. The high-temperature operating fuel-cell module according to claim 1, wherein
the combustion chamber is opened so that a flame formed by combustion in the combustion chamber is directed upward in a vertical direction, and the fuel-cell stack is disposed below the combustion chamber.

9. The high-temperature operating fuel-cell module according to claim 1, wherein
the cathode off-gas collector has an opening through which the cathode off-gas flowing in the fuel-cell stack container flows; and
a projected area of the opening is smaller than that of the fuel-cell stack.

10. The high-temperature operating fuel-cell module according to claim 1, wherein
the cathode off-gas collector has an opening through which the cathode off-gas flowing in the fuel-cell stack container flows; and
an area of the opening through which the cathode off-gas passes is smaller than a cross sectional area of a flow passage through which the cathode off-gas that has not reached the opening yet flows.

11. The high-temperature operating fuel-cell module according to claim 9, wherein
the opening of the cathode off-gas collector is narrow; and
the cathode off-gas flowing in the fuel-cell stack container flows into the cathode off-gas collector through the narrow opening.

12. The high-temperature operating fuel-cell module according to claim 9, further comprising a flow straightening plate that is provided in the opening of the cathode off-gas collector and straightens flow of the cathode off-gas flowing into the cathode off-gas collector through the opening.

13. The high-temperature operating fuel-cell module according to claim 1, wherein
the ejector has a cylindrical shape and the diffusion plate surrounds the ejector so that the center thereof is located at a central axis of the ejector; and
the fuel-cell stack and the fuel-cell stack container are disposed so that a central line passing midpoints of the fuel-cell stack and the fuel-cell stack container in a width direction thereof coincides with the central axis of the ejector.

* * * * *